(12) United States Patent
Marking et al.

(10) Patent No.: US 8,793,762 B2
(45) Date of Patent: Jul. 29, 2014

(54) SIMPLE NONAUTONOMOUS PEERING NETWORK MEDIA

(75) Inventors: Aaron Marking, Portland, OR (US); Kenneth Goeller, Los Angeles, CA (US); Jeffrey Bruce Lotspiech, Henderson, NV (US)

(73) Assignee: Secure Content Storage Association LLC, Beaverton, OR (US)

( * ) Notice: Subject to any disclaimer, the term of this patent is extended or adjusted under 35 U.S.C. 154(b) by 142 days.

(21) Appl. No.: 13/207,914

(22) Filed: Aug. 11, 2011

(65) Prior Publication Data

US 2012/0042167 A1 Feb. 16, 2012

Related U.S. Application Data

(63) Continuation-in-part of application No. 12/839,105, filed on Jul. 19, 2010, and a continuation-in-part of application No. 12/369,708, filed on Feb. 11, 2009, and a continuation-in-part of application No. 12/713,111, filed on Feb. 25, 2010, and a continuation-in-part of application No. 10/945,623, filed on Sep. 20, 2004.

(60) Provisional application No. 61/372,695, filed on Aug. 11, 2010, provisional application No. 61/226,421, filed on Jul. 17, 2009, provisional application No. 61/027,757, filed on Feb. 11, 2008, provisional application No. 61/082,404, filed on Jul. 21, 2008, provisional application No. 61/096,686, filed on Sep. 12, 2008, provisional application No. 61/148,295, filed on Jan. 29, 2009, provisional application No. 61/155,489, filed on Feb. 25, 2009, provisional application No. 61/159,054, filed on Mar. 10, 2009.

(51) Int. Cl.
*H04L 29/06* (2006.01)

(52) U.S. Cl.
USPC ............. 726/3; 726/2; 726/4; 726/5; 726/14; 726/17; 726/21; 713/171; 713/181; 380/282; 725/87; 725/109; 709/219

(58) Field of Classification Search
USPC ........... 713/171, 181; 726/2–4, 17, 21, 5, 14; 725/87, 109; 709/219
See application file for complete search history.

(56) References Cited

U.S. PATENT DOCUMENTS

| 5,204,897 A | 4/1993 | Wyman |
| 5,742,757 A | 4/1998 | Hamadani et al. |

(Continued)

FOREIGN PATENT DOCUMENTS

| EP | 0610623 A1 | 8/1994 |
| EP | 0917132 A2 | 5/1999 |

(Continued)

OTHER PUBLICATIONS

PCT International Search Report and Written Opinion dated Dec. 22, 2011, International Application No. PCT/US2011/047459 filed Aug. 11, 2011.

(Continued)

*Primary Examiner* — Thanhnga B Truong
(74) *Attorney, Agent, or Firm* — Gates & Cooper LLP

(57) ABSTRACT

A method of playing content across a network includes receiving, at a media player, an input from a user selecting media located on a network, sending a request across a network comprised of devices employing a common security protocol, the request to identify peer devices on the network, receiving a response across the network from a peer device, and accessing the media from a content memory of the peer device. A method of tracking valid peers on a secure media network, includes receiving, at a media player, an input from a user selecting media located on a peer device on the network, performing an authentication test of the peer player, determining if a latency associated with the peer player meets a criteria, and updating a latency log on the media player to include the peer player. A device has a content memory to store media content for playback, a network port arranged to allow the device to access a network, and a controller programmed to send a request through the network port to a network, the request being for a particular media content file, communicate with a peer device across the network to authenticate a communication session with the peer device, receive a response from the peer device indicating that the session has been authenticated, and access the media content file on a content memory on the peer device.

15 Claims, 6 Drawing Sheets

(56) References Cited

U.S. PATENT DOCUMENTS

| | | |
|---|---|---|
| 5,870,543 A | 2/1999 | Ronning |
| 6,092,195 A | 7/2000 | Nguyen |
| 6,141,010 A | 10/2000 | Hoyle |
| 6,253,193 B1 | 6/2001 | Ginter et al. |
| 6,701,528 B1 | 3/2004 | Arsenault et al. |
| 7,017,044 B1 | 3/2006 | Carpenter et al. |
| 7,076,468 B2 | 7/2006 | Hillegass et al. |
| 7,103,574 B1 | 9/2006 | Peinado et al. |
| 7,278,165 B2 | 10/2007 | Molaro |
| 7,496,540 B2 | 2/2009 | Irwin et al. |
| 7,584,258 B2 | 9/2009 | Hudson et al. |
| 7,584,285 B2 | 9/2009 | Hudson et al. |
| 7,594,275 B2 | 9/2009 | Zhu et al. |
| 7,653,928 B2 * | 1/2010 | Almstrand et al. .............. 725/87 |
| 2002/0023248 A1 | 2/2002 | Suzukil et al. |
| 2002/0056118 A1 | 5/2002 | Hunter et al. |
| 2003/0110503 A1 | 6/2003 | Perkes |
| 2003/0121047 A1 | 6/2003 | Watson et al. |
| 2003/0140088 A1 | 7/2003 | Robinson et al. |
| 2003/0145093 A1 | 7/2003 | Oren et al. |
| 2003/0149670 A1 | 8/2003 | Cronce |
| 2003/0163372 A1 | 8/2003 | Kolsy |
| 2003/0187679 A1 | 10/2003 | Odgers et al. |
| 2003/0229789 A1 * | 12/2003 | Morais et al. ................ 713/171 |
| 2004/0024688 A1 | 2/2004 | Bi et al. |
| 2004/0091114 A1 | 5/2004 | Carter et al. |
| 2004/0167857 A1 | 8/2004 | Baker et al. |
| 2004/0225894 A1 | 11/2004 | Colvin |
| 2005/0010531 A1 | 1/2005 | Kushainagar et al. |
| 2005/0027871 A1 | 2/2005 | Bradley et al. |
| 2005/0050218 A1 | 3/2005 | Sheldon |
| 2005/0060745 A1 | 3/2005 | Riedi et al. |
| 2005/0177624 A1 | 8/2005 | Oswald et al. |
| 2005/0188214 A1 | 8/2005 | Worley et al. |
| 2006/0218620 A1 | 9/2006 | Nadarajah et al. |
| 2009/0094453 A1 | 4/2009 | Bradley et al. |
| 2009/0204778 A1 | 8/2009 | Marking |
| 2010/0142543 A1 | 6/2010 | Shaikh et al. |
| 2010/0218000 A1 | 8/2010 | Marking |
| 2010/0299458 A1 | 11/2010 | Marking |

FOREIGN PATENT DOCUMENTS

| | | |
|---|---|---|
| WO | 9962022 | 12/1999 |
| WO | 0219589 A1 | 3/2002 |
| WO | 0229510 A2 | 4/2002 |

OTHER PUBLICATIONS

European Search Report dated Jan. 3, 2013, Application No. 09710597.7.

Extended European Search Report dated Oct. 16, 2013 for European Patent Application No. 10746857.1.

* cited by examiner

SIMPLE NONAUTONOMOUS PEERING NETWORK MEDIA

RELATED APPLICATIONS

This application claims benefit of U.S. Provisional Patent Application No. 61/372,695, entitled "SIMPLE NONAUTONOMOUS PEERING NETWORK MEDIA," by Aaron Marking et al., filed Aug. 11, 2010, which application is hereby incorporated by reference herein.

This application is also a continuation-in-part of the following U.S. Patent Applications:

U.S. patent application Ser. No. 12/839,105, entitled "SIMPLE NONAUTONOMOUS PEERING MEDIA CLONE DETECTION," by Aaron Marking et al., filed Jul. 19, 2010, which application is incorporated by reference herein, and which application claims benefit of U.S. Provisional Patent Application No. 61/226,421, entitled "SNAP STRIPING AND BONDING," by Aaron Marking et al., filed Jul. 17, 2009;

This application is also a continuation-in-part of the following U.S. Patent Applications:

U.S. patent application Ser. No. 12/369,708, entitled "SIMPLE NON-AUTONOMOUS PEERING ENVIRONMENT, WATERMARKING AND AUTHENTICATION," by Aaron Marking et al., filed Feb. 11, 2009, which claims benefit of U.S. Provisional Patent Application Ser. No. 61/027,757, entitled "ENHANCED WATERMARK PATTERNS IN A SNAP ENVIRONMENT," by Aaron Marking, filed Feb. 11, 2008, U.S. Provisional Patent Application Ser. No. 61/082,404, entitled "SIMPLE NON-AUTONOMOUS PEERING," by Aaron Marking, filed Jul. 21, 2008, U.S. Provisional Patent Application Ser. No. 61/096,686, entitled "METHOD OF AUTHENTICATING NON-VOLATILE STORAGE MEDIA USING BAD BLOCKS IDENTIFIED DURING THE POST-MANUFACTURE TESTING PROCESS," by Aaron Marking, filed Sep. 12, 2008, and U.S. Provisional Patent Application Ser. No. 61/148,295, entitled "SIMPLE NON-AUTONOMOUS PEERING BINDING," by Aaron Marking, filed Jan. 29, 2009;

U.S. patent application Ser. No. 12/713,111, entitled "CONTENT DISTRIBUTION WITH RENEWABLE CONTENT PROTECTION," by Aaron Marking et al., filed Feb. 25, 2010, which application is hereby incorporated by reference herein and which application claims benefit of U.S. Provisional Patent Application Ser. No. 61/155,489, entitled "SNAP STRIPING AND BINDING," by Aaron Marking et al., filed Feb. 25, 2009, U.S. Provisional Patent Application Ser. No. 61/159,054, entitled "STRIPING AND BINDING," by Aaron Marking et al., filed Mar. 10, 2009, and which application is a continuation-in-part of U.S. patent application Ser. No. 10/945,623, entitled "MEDIA ON DEMAND VIA PEERING," by Aaron Marking, filed Sep. 20, 2004.

BACKGROUND

The packaging of media content, such as video or audio content, into digital media files has made the exchange of the content very easy and convenient for users. However, users freely exchanging content may violate the content owner's property rights. Content owners also want to restrict the copying of copyright protected content. There are many examples of technologies that make the transfer of copyright protected content very difficult. When physical media is used to store content, permanently or temporarily, for example in electronic purchase, rental and subscription movie service business models, content owners or their licensees use a variety of cryptographic binding methods. These methods typically use a unique media or device identifier or similar player attributes in a cryptographic function to protect the content from being copied or transferred such that it may be said to be bound to the device. Generally, this binding of the content is based upon a particular playback device, which is undesirable for users. Users may want to play their content on a different device than the device that received the content or they may want to transfer it among several personal devices.

One approach involves peering of content, where users transfer data amongst themselves. In order to preserve copyrights and to avoid pirating of the content, a 'non-autonomous' peering system may be employed. In contrast to a typically peering system, where users transfer content freely, the system is 'non-autonomous.' 'Non-autonomous' as used here means that the system includes mechanisms that only allow transfer of the content with the assistance of a centralized authority, while allowing users to transfer media content between their own compliant devices. A peer in this system consists of an end-user owned device acting as the source for a transfer, while in most other systems content resides on a server for download.

Examples of a non-autonomous peering system can be found in U.S. Pat. No. 7,165,050, and US Patent Publication No. 20060064386, both titled, "Media on Demand Via Peering." An example of methods of manufacturing and binding components usable in a non-autonomous peering system can be found in U.S. patent application Ser. No. 12/369,708, "Simple Non-Autonomous Environment, Watermarking And Authentication," filed Feb. 11, 2009. U.S. patent application Ser. Nos. 12/369,709, and 12/713,111 discuss the use of a peering system in conjunction with flash memory devices.

A SNAP player, one that complies with the Simple Non-Autonomous Peering principles set out in the references above, can be used to create a centralized repository for bulk storage of their owned content. While in one regard, centralized bulk storage allows consumers to securely store their content library in one secure, centralized location, this could also be seen as limiting the portability provided by SNAP's media binding methods.

DETAILED DESCRIPTION OF THE EMBODIMENTS

The below discussion uses several terms that may become confusing. The discussion uses the term 'local memory device' to refer to a non-volatile memory device that contains 'content,' which is physically connected to the playback device. Local Memory Devices may be either removable or embedded. 'Content' includes any type of experiential content and includes, but is not limited to, movies, television shows, recorded performances, video files, audio files, and games. The memory device may include removable memory, such as flash memory drives, so-called 'thumb' drives, memory cards, embedded flash memory, spinning and solid state hard drives, and memory sticks, but no limitation is intended, nor should any be implied by these examples. The memory device will be referred to here as 'content' memory, because it resides separately from on-board memory of a playback device, although it may be internal to the playback device. The below discussion also uses the term 'network memory device' to refer to any content memory device accessible to a player via a 'SNAP private network.' A SNAP private network is a secure private network, wired or wireless that allows users to experience and/or manage content stored on memory devices connected to other devices within the network. This network may be established only for the brief periods of time when the users are actively downloading content, not as a pre-exiting network. A particular device may only join the network when downloading content.

Figure 1:
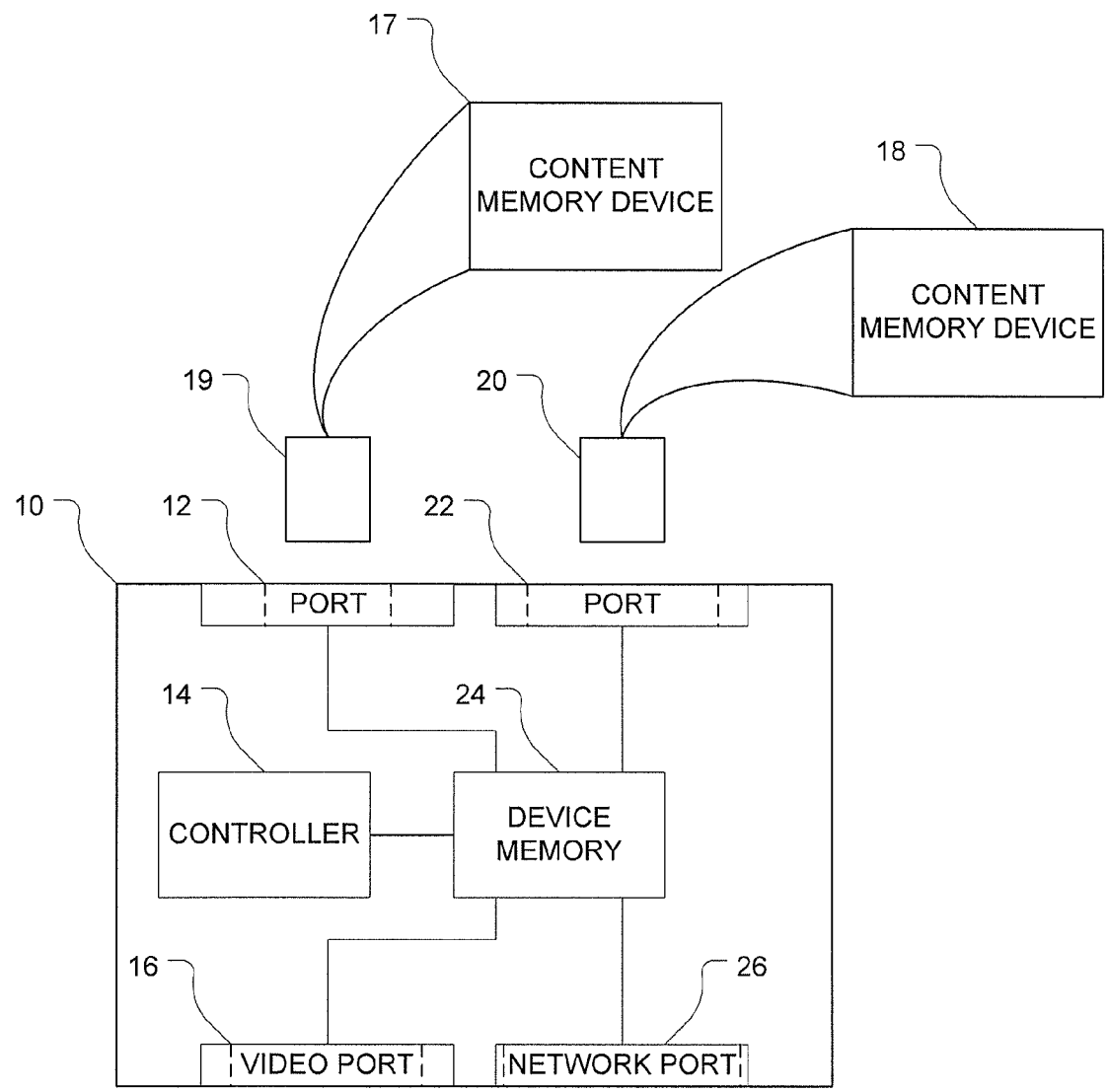
FIG. 1 shows an embodiment of a network playback device capable of playing content from a memory device either locally or via a SNAP network.

FIG. 1 shows an embodiment of a playback device capable of playing content from a local or network memory device. The playback device 10 has a controller 14 that performs device authentication and media validation as described in the referenced co-pending applications. During this validation process, the controller may access a device memory, 24. The device memory 24 is the 'on-board' memory that exists in the playback device separate from the content memory containing the content. The playback device also has ports 12 and 22 to accept memory devices. In the case of embedded memory, the port may take the form of a connector to connect between the processor and the embedded memory. The embedded memory will still be referred to here as the 'content memory' to separate it from the device memory used for device operation.

As stated above, memory devices may take one of many different forms, or include different forms in different ports, including CompactFlash; MultiMedia Cards (MMC), including Reduced Size-MMC; Secure Digital (SD) cards, including mini-SD and micro-SD; and Memory Sticks. These of course are merely examples of the different memory formats and form factors, which may also be embodied in memory devices such as 20 that connect to the playback device by an external connector 22, such as Universal Serial Bus (USB) connectors, and those that comply with IEEE standard 1394, also referred to as 'firewire.' These are just examples and many different protocols may be used such as VESA (Video Electronics Standards Association) DisplayPort, protected by Digital Transmission Content Protection (DTCP), as well as many others. In the embodiment of embedded memory including hard disks, the content memory device may communicate with the controller using IDE (Integrated Drive Electronics), SATA (Serial Advanced Technology Attachment), SCSI (Serial Computer System Interface), SAS (Serial Attached SCSI) or USB interfaces.

The Playback Device 10 of FIG. 1 has a video port 16 which may be a High Definition Multimedia Interface, (HDMI), either wireless or wired that is protected by Highbandwidth Digital Content Protection (HDCP). In addition to the video port 16 for outputting video for playback, a Playback Device may also have an integrated video display, such that a user may experience their content directly from the playback device without needing to connect it to a television or other display device.

The Playback Device 10 of FIG. 1 further has a network port 26 which may be wired or wireless. In the case of a wireless port such as an IEEE 802.11 compliant wireless connection, security measures such as WPA2 or comparable encryption would be advisable in order to allow the device to communicate with a SNAP secure network, or other network resources such as a high speed interne connection. The secure network allows users to manage content across all devices within the network, as well as enabling a network playback mode as described later.

Figure 2:
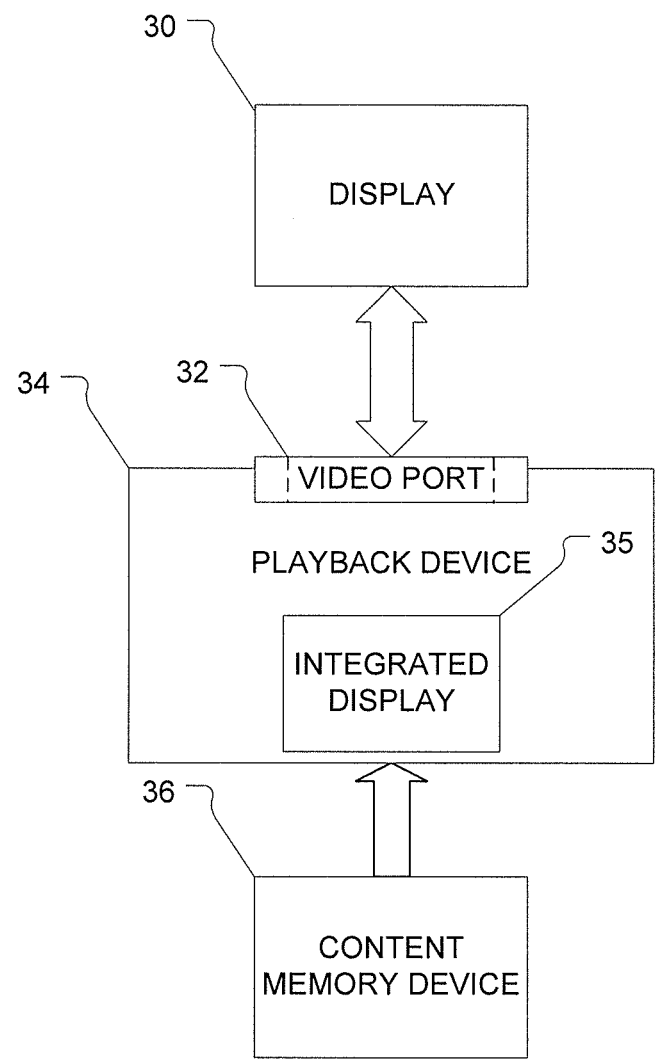
FIG. 2 shows an embodiment of a SNAP device having an included display, as well as video outputs and a network connection.

FIG. 2 shows one embodiment of a playback device containing an integrated display 35. The playback device of FIG. 2 also has a video output that may be wireless or wired HDMI protected by the DTCP protocol. SNAP Media 36 is connected to the playback device 34. Following successful NNL authentication and SNAP media validation as described in the referenced art, the user may experience the content directly from the integrated display 35, or may choose to output the playback via the video port 32 to a display 30. In this configuration, all NNL and SNAP cryptographic functions and processing functionalities are performed by the controller of playback device 34. The NNL (Naor-Naor-Lotspiech) key management is a key management technique. While it is used here, other types of security key protocols may also be used. SNAP cryptographic functions include striping, where content files are divided into segments, each encoded differently, and binding, where the content files downloaded to a particular device or memory device are bound to the device using unique identifiers for the device.

Figure 3:
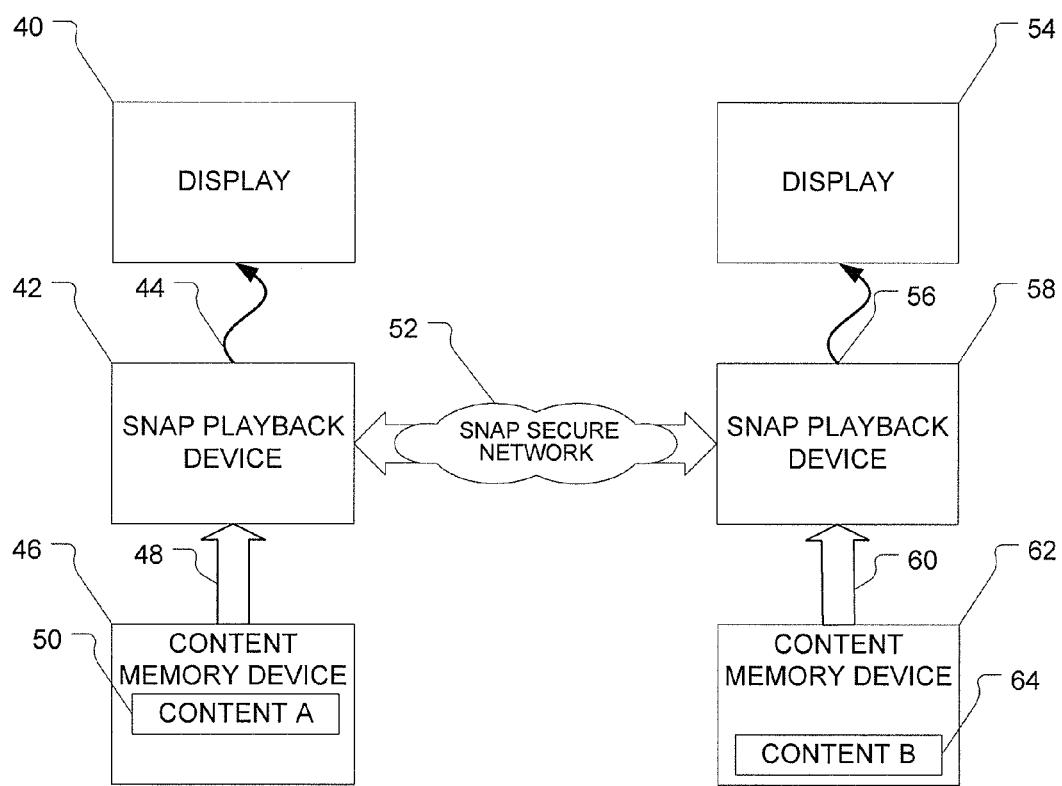
FIG. 3 shows an embodiment of a SNAP secure network of two devices.

FIG. 3 shows two SNAP playback devices (42 and 58) connected by a SNAP secure network 52. In this configuration, a user operating playback device 42 may choose to play content A (50) locally from content memory device 46 as described in FIG. 2. Additionally, a user may request "Network Media", whereby playback device 42 can communicate with the playback device 58 via the secure network 52 to gain access to content B (66) stored on content memory device 64.

In order to gain access to content memory device 62, playback device 42 first completes NNL MKB Update (media key bundle) protocol and AKE (Authenticated Key Exchange) with playback device 58 to verify that both devices share the most current NNL data available to them and that neither playback device's device keys have been revoked. Following successful AKE, playback device 58 grants playback device 42 access to its local content memory device 62 which it has already validated either at insertion, power on, or reset.

Playback device 42 may now continue with the playback routine as described in the referenced art, performing all NNL and SNAP cryptographic functions as if content memory device 62 were local to it with playback device 58 serving as a proxy only. The processed content could then be output from the video port of playback device 42 for playback on display 40. Similarly, if playback device 42 has an integrated display as described in FIG. 2, the content may be displayed directly on the integrated display.

Under certain circumstances, it may be necessary to perform certain aspects of media validation that would be adversely affected by network latency. In this scenario, playback device 42 can direct playback device 58 to perform the necessary validation functions locally and respond with the results.

Figure 4:
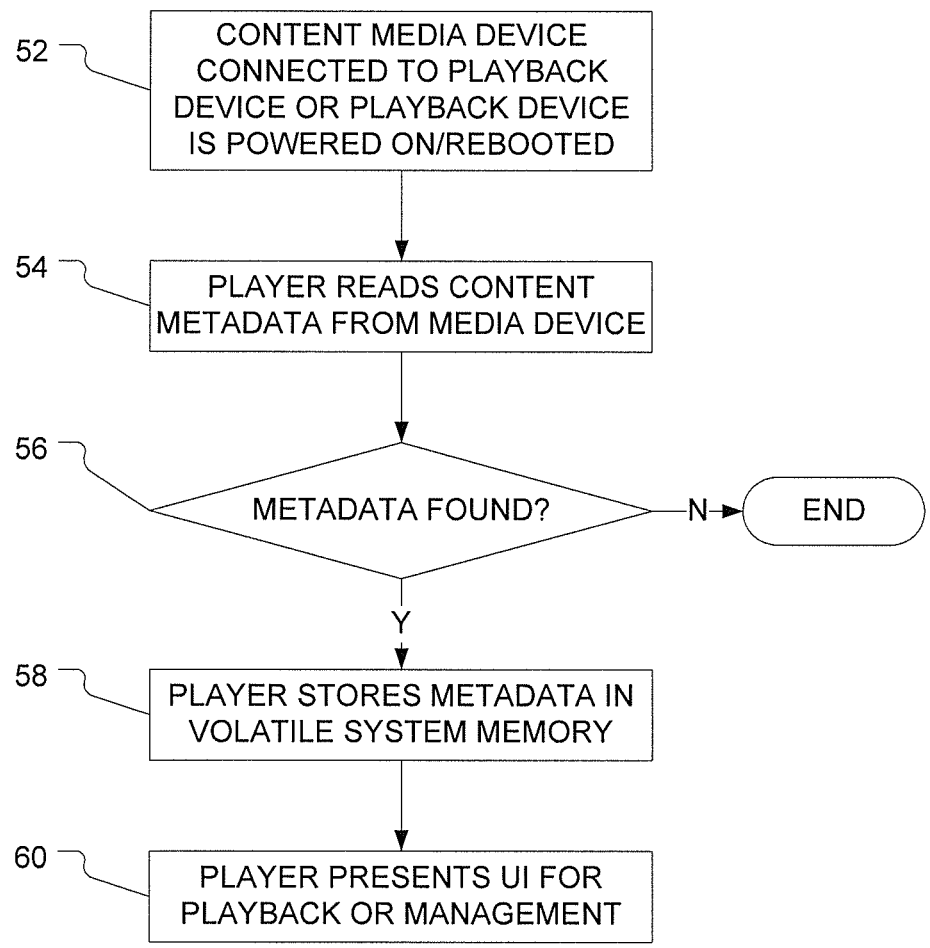
FIG. 4 shows an embodiment of a playback device detecting a local content memory device and presenting a user interface.

FIG. 4 shows a playback device at 50 discovering a content memory device at insertion, power on, or reboot. At 56 the playback device attempts to read media descriptive metadata which may include, but is not limited to box art, titles, cast, genera, etc., which the playback device uses to present a user interface and related functions. It should be noted that none of the descriptive metadata read at 56 is considered "security sensitive." At 58, the playback stores descriptive metadata in its system memory for use in presenting a user interface. At 60, the playback device presents a graphic user interface, allowing users to browse, manage, or play content stored on content storage devices attached to the playback device.

Figure 5:
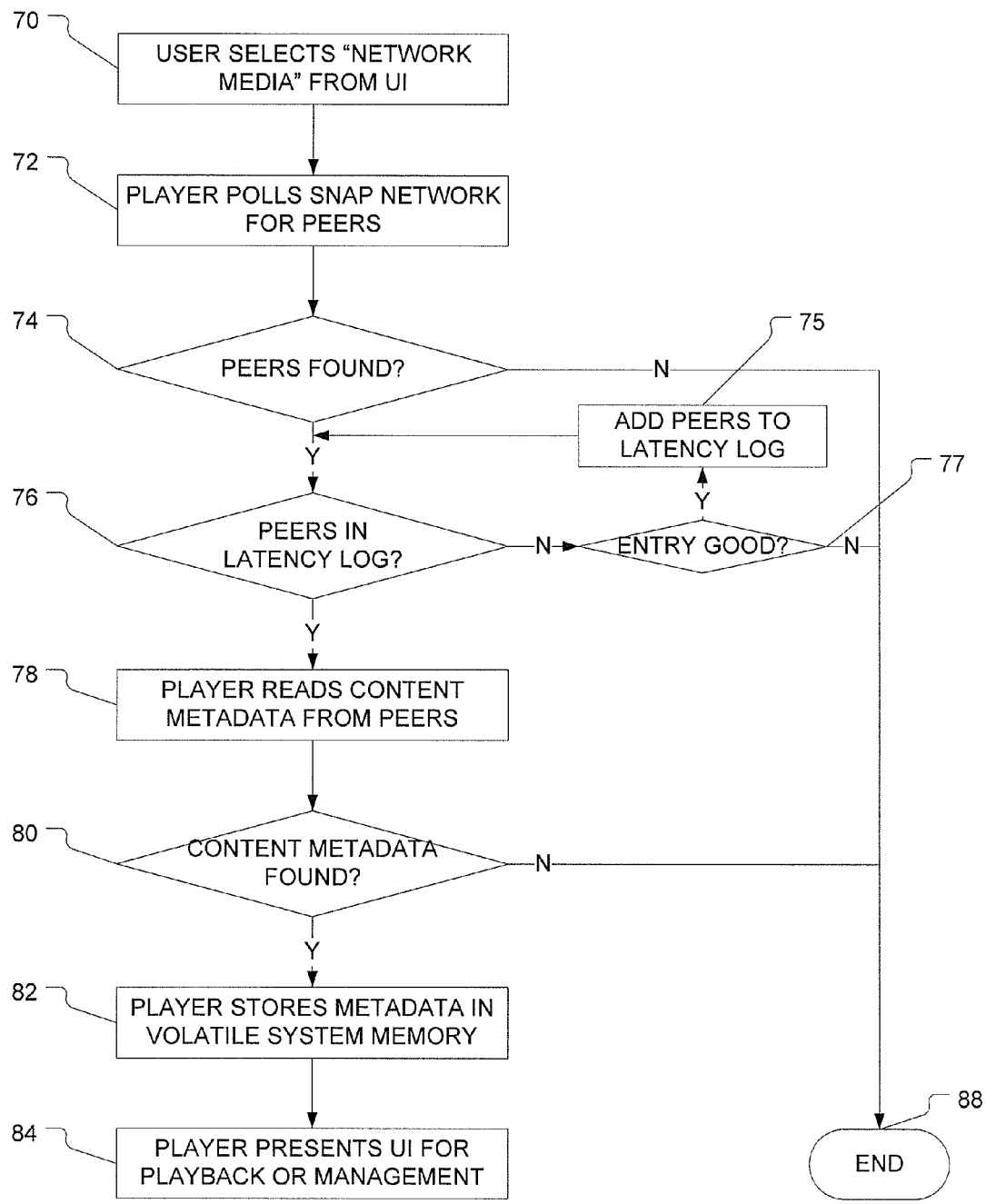
FIG. 5 shows an embodiment of a playback device locating and displaying content stored on a network content memory device connected to a different playback device in the SNAP secure network.

FIG. 5 shows a user selecting "network media" at 70. At 72 the playback device polls other devices in the secure network. Peers found at 74 are checked against the playback device's latency log to determine if they have been tested for sufficiently low latency to support network playback. If peers have a valid entry in the latency log, the player requests and receives content descriptive metadata from peers at 78. The metadata is stored in the playback device's system memory at 82, and used to populate a user interface at 84. The purpose of the latency test is to make sure the player and the device that has the content are both on the user's local network. In other words, the media device is not providing the content across the Internet, which would defeat the content owner's copyright. Latency testing is well known in the art, for example, it is practiced in the Digital Transmission Content Protection protocol.

Figure 6:
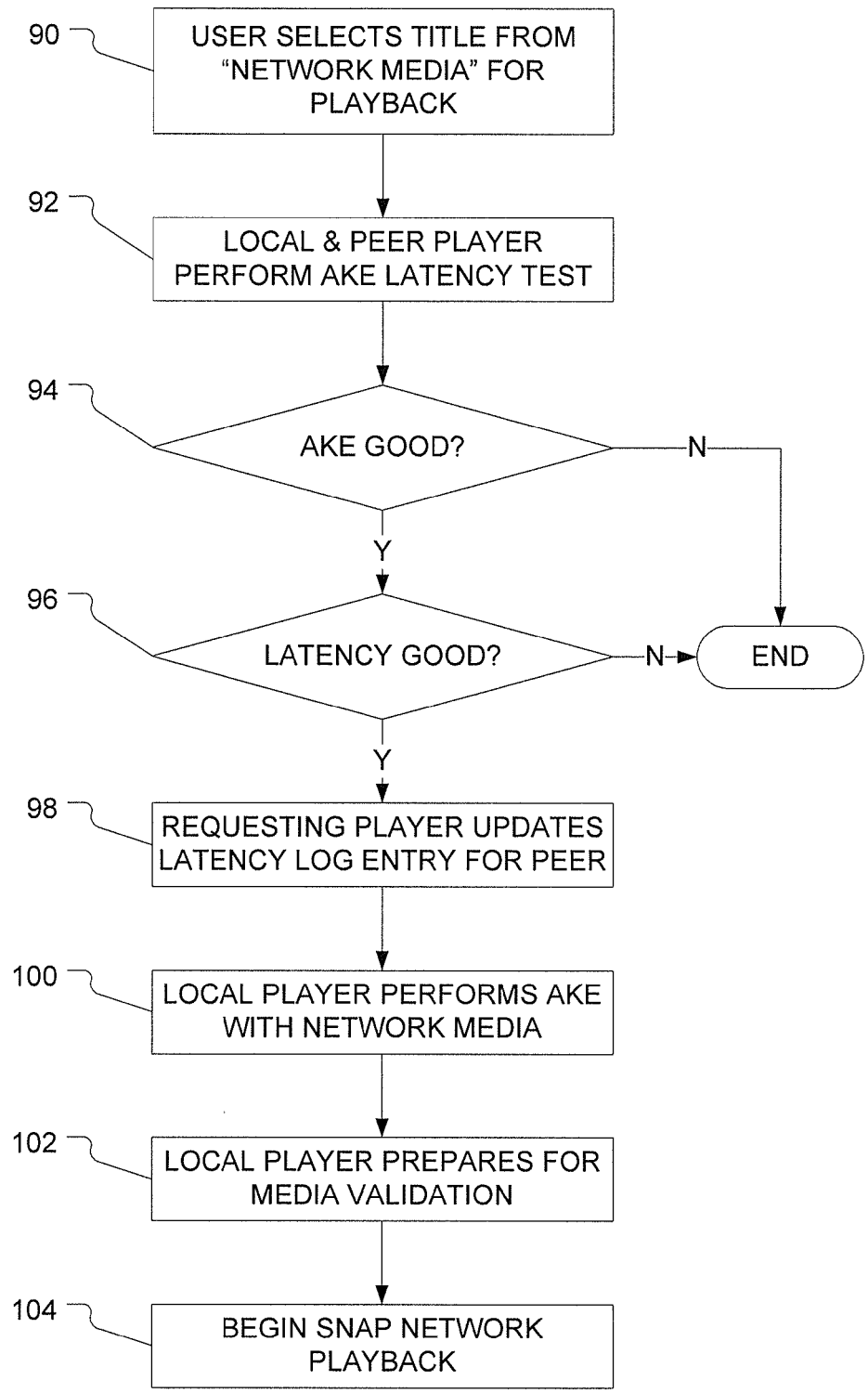
FIG. 6 shows a SNAP playback device initiating playback of content stored on a network content memory device.

In FIG. 6, at 90 a user selects one of the titles presented in the user interface of 84 from FIG. 4 for network playback. At 92 the requesting player begins a combined latency/ NNL AKE test with the peer playback device. This test might include pinging the peer playback device multiple times and interleaving AKE challenge and response commands between ping commands such that a time-of-test average latency may be calculated by the initiating playback device. It should be noted that in a compliant device, performance of AKE calculations is sufficiently fast that they should have a negligible effect, if any on network latency test results. Assuming AKE and latency test results are within acceptable parameters, the requesting playback device updates its latency log entry for the peer device for future use.

At 100, the local player communicates directly with the network content memory device connected to the peer playback device via the network with the peer playback device serving as a proxy. The requesting player performs NNL update and AKE protocols at 100, as described in the referenced materials directly with the network media across the secure network. This provides session-based security between the requesting playback device and the network content memory device, and the requesting playback device secure access the network content memory device's protected area as if it were local. In this manner, all communication of sensitive cryptographic data may be encrypted using the session key generated by the AKE between the requesting player and the network content storage device.

As discussed in co-pending application Ser. No. 12/713, 111, the cryptographic authentication may be based on media key blocks. However, other cryptographic protocols, such as public/private key, are within the scope of this invention. In one embodiment, the authentication uses variants. A 'variant' as that term is used here is a particular version of a microcode that is used to derive the necessary keys and/or functions to access the content. A 'microcode function' as used here refers to a set of firmware instructions, algorithms and constants used by a player to perform cryptographic and other media-related functions. Upon manufacture, the playback device may have stored in it some predetermined number of these variants. These variants are stored encrypted in the player device.

In addition, there may be several different types of variants. In the SNAP system, for example, different types of variants may exist. A first variant may be used to derive a unique code related to the media device, and a second variant may use that in conjunction with another unique identifier for the media to verify the media. A third variant may be used to derive the keys to unlock or decrypt the content that is downloaded to the media. Other types of variants may be used, or the example variants given may not be used in any particular system depending upon the protection needs of the content.

Because the predetermined number of variants may be exhausted over time, the renewable protection scheme provides for a means to renew the variants as needed. The system generally accomplishes this by transmitting new variants with the downloaded content.

During the local playback device's preparation for media validation at 102, the selected renewable function variant for the title may indicate that its validation methods may not be performed remotely. This allows the content providers to disallow network playback for new releases, for example. After a particular time has elapsed, the network playback may be allowed.

If this occurs, the requesting player communicates with the peer playback device via authenticated command across the secure network, directing it to authenticate itself with the network content storage device local to it, and perform media validation locally. The peer playback device performs media validation and responds to the requesting playback device with the result of the validation test it performs, which must be consistent with the result expected by the requesting playback device based on the variant it has selected. Following successful media validation by either the requesting playback device, or the peer playback device, SNAP network playback can begin.

There has been described to this point a particular embodiment for SNAP network device playback, with the understanding that the examples given above are merely for purposes of discussion and not intended to limit the scope of the embodiments or the following claims to any particular implementation.

What is claimed is:
1. A playback device, comprising:
a network port arranged to allow the playback device to access a wide network having a plurality of peer devices that communicate using a common security protocol; and
a controller;
a playback device memory, communicatively coupled to the controller, comprising instructions for programming the controller to:
receive a request to access, via the network port and the wide network for media content selected for playback by a user of the playback device;
perform a test across the wide network in order to determine if any one or more of the peer devices on the wide network which stores at least a part of the media content selected for playback is on the user's local network, the test comprising:
identifying one or more of the plurality of peer devices on the wide network which stores at least a part of the media content selected for playback;
determining a latency of communication between each such identified peer device and the playback device; and
accessing, via the wide network, the at least a part of the media content from a content memory of the at least one identified peer device, the accessed media content used for playback by the playback device.

2. The device of claim 1, wherein the instructions further comprise instructions to store the at least a part of the media content in a content memory of the playback device.

3. The device of claim 1, the playback device memory is separate from the content memory.

4. The device of claim 1, further comprising at least one memory port configured to accept a playback device content memory device, for storing the accessed at least a part of the media content.

5. The device of claim 4, wherein the playback device content memory comprises a removable memory device.

6. The device of claim 4, wherein the playback device content memory comprises an embedded memory device.

7. The playback device of claim 1, wherein the instructions for performing the test comprise instructions for:
   transmitting a request across the wide network, the request including directions for the identified peer devices to locally perform a validation under the security protocol; and
   receiving a response from the identified peer devices indicating completion of the validation.

8. The playback device of claim 1, wherein the instructions for determining a latency of communication between each such identified peer device and the playback device comprises instructions for determining that a latency log stored by the playback device includes an entry identifying the identified peer device prior to accessing the media content from the identified peer device.

9. The playback device of claim 8, wherein the instruction further comprise instructions to:
   transmit a plurality of pings to each identified peer device, the plurality of pings interleaved with authenticated key exchange messages;
   receive a plurality of responses to the plurality of pings; and
   calculate the latency of the communications between the playback device and each identified peer device from the plurality of responses to the plurality of pings.

10. A method of accessing media content across a wide network having a plurality of peer devices that communicate using a common security protocol, comprising:
    performing, by a playback device which is one of the plurality of peer devices in the wide network and is also part of a user's local network:
      receiving a request to access, via the wide network, media content selected for playback by a user of the playback device;
      performing a test across the wide network in order to determine if any one or more of the peer devices on the wide network which stores at least part of the media content selected for playback is on the user's local network, the test performed by:
        identifying one or more of the plurality of peer devices on the wide network which stores at least part of the media content selected for playback, and
        for each identified peer device, determining a latency of communication between such peer device and the playback device; and
      for the at least one identified peer device determined to be part of the user's local network according to the determined latency of communication between such device and the playback device, accessing, via the wide network, the at least a part of the media content stored in such identified peer device, the accessed media content used for the playback by the playback device.

11. The method of claim 10, wherein determining the latency of communication between such peer device and the playback device comprises determining that a latency log stored by the playback device includes an entry for such peer device prior to accessing the at least a part of the media content stored in such peer device.

12. The method of claim 11, further comprising:
    transmitting a plurality of pings to each identified peer device, the plurality of pings interleaved with authenticated key exchange messages;
    receiving a plurality of responses to the plurality of pings; and
    calculating the latency of the communications between the playback device and each identified peer device from the plurality of responses to the plurality of pings; and
    storing an entry in the latency log according to the calculated latency.

13. The method of claim 10, wherein performing the test across the wide network comprises performing an encryption key exchange.

14. The method of claim 13, wherein the encryption key exchange comprises a Naor-Naor-Lotspiech authentication and an Authenticated Key Exchange.

15. The method of claim 10, wherein identifying one or more of the plurality of peer devices on the wide network which stores at least part of the media content selected for playback comprises:
    transmitting a request across the wide network, the request including directions for the at least one of the peer devices to locally perform a validation under the security protocol and;
    receiving a response indicating completion of the validation.

* * * * *